June 2, 1964

T. M. HUNTER 3,135,851

RESISTANCE WELDING APPARATUS INCLUDING A TRANSFORMER

Filed Dec. 27, 1961

INVENTOR.
THOMAS M. HUNTER

BY

*Harry B. Cook,*
ATTORNEY

INVENTOR.
THOMAS M. HUNTER
BY
ATTORNEY

June 2, 1964     T. M. HUNTER     3,135,851
RESISTANCE WELDING APPARATUS INCLUDING A TRANSFORMER
Filed Dec. 27, 1961                    3 Sheets-Sheet 3
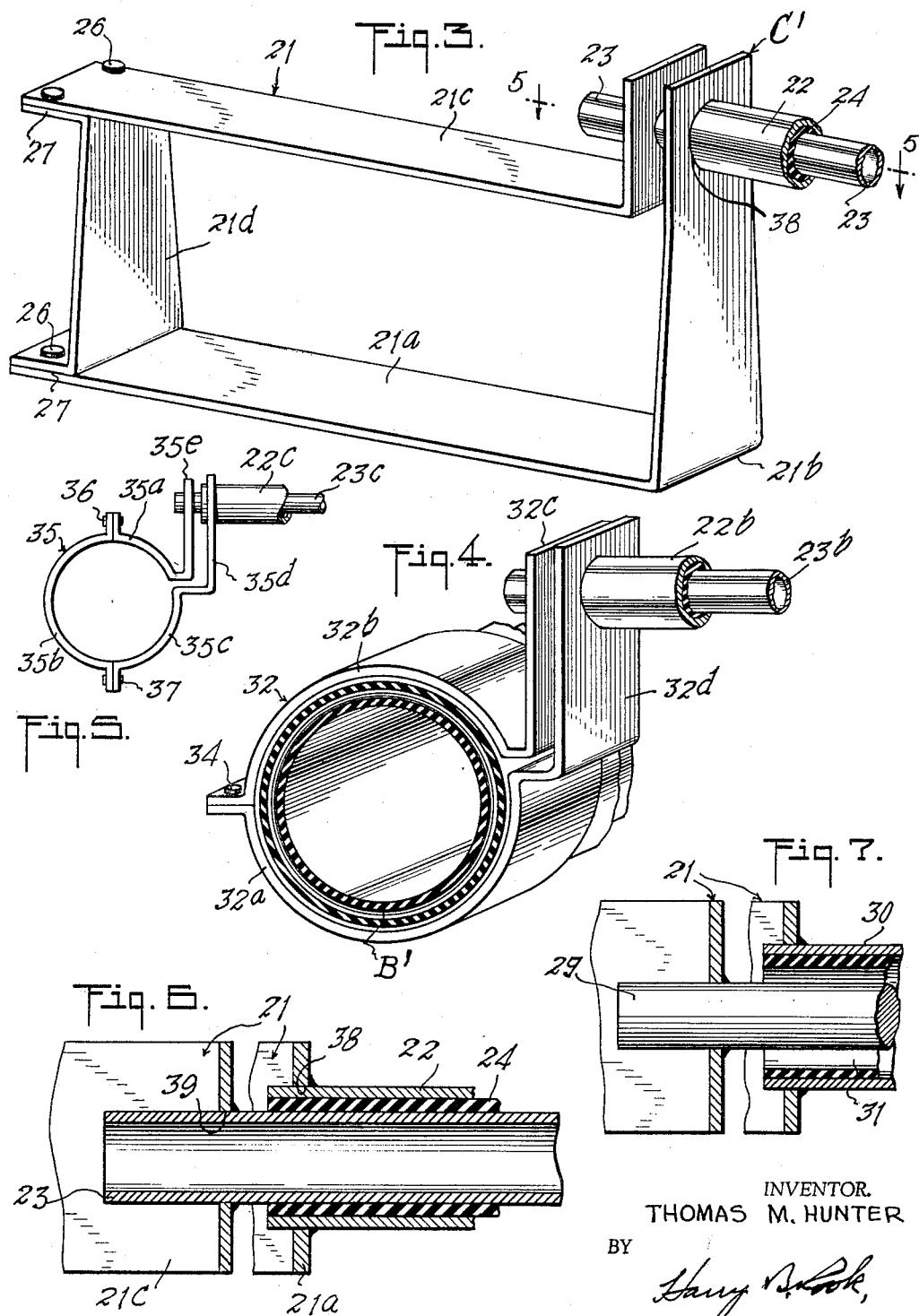
INVENTOR.
THOMAS M. HUNTER
BY
ATTORNEY

United States Patent Office 3,135,851
Patented June 2, 1964

3,135,851
RESISTANCE WELDING APPARATUS INCLUDING A TRANSFORMER
Thomas M. Hunter, 25 Barberry Lane, Short Hills, N.J.
Filed Dec. 27, 1961, Ser. No. 162,326
15 Claims. (Cl. 219—63)

This application is a continuation-in-part of my copending application Serial No. 34,240 filed June 6, 1960; and the invention relates to a rotary electrical resistance welding apparatus of the general type shown in my Patent No. 2,561,739 dated July 24, 1951, and Patent No. 2,616,016 issued October 28, 1952, to William E. Shenk, assignor, which include transformer structures and are especially adapted for use in welding seams in sheet metal or tubing, wherein a large current with a low voltage is required.

Forty years ago, tubes were being welded by the longitudinal-seam butt-welding method at speeds of 25 to 60 feet per minute and at the present time such welding is carried on at speeds of 60 to 500 feet per minute. There is an increasing desire to perform such welding operations at higher speeds, for example, speeds of 1000 feet per minute, but welding at such speeds requires the use of higher frequencies than have been used heretofore in resistance welding apparatus. According to present practice, large currents of from 10,000 amperes to 300,000 amperes are utilized and it is recognized that the utilization of such large currents at high frequencies, for example, a frequency of 360 cycles or higher, without excessive losses, poses a serious problem in the construction of transformers which includes the provision of effective secondary conductors and efficient means for cooling the transformer.

In transformers like those shown in the above patents, the casings serve as the secondaries of the transformers and generally are formed of heavy copper castings which not only provide poor conductivity but are also subject to leakage of the coolant such as oil through the pores of the casting.

In my co-pending application, there is described a resistance welding apparatus having a support, a welding transformer mounted on the support comprising a primary winding and a secondary circuit that includes a pair of welding electrodes mounted on said support, the secondary circuit including a plurality of separate units each having portions in inductive relation to said primary winding and spaced from said portions of the adjacent units and having one terminal connected to one welding electrode and the other terminal connected to another welding electrode. The primary winding and secondary units are enclosed within a casing which forms no part of the secondary circuit of the transformer but provides space for circulation of a cooling fluid around the secondary units and the primary winding. Each secondary unit is shown as comprising two copper tubes of different diameter connected together at one end, each having a partially flattened end portion in inductive relation to the primary winding and each having its opposite end portion elongated and straight, the straight portion of the smaller diameter extending through the straight portion of the larger diameter in insulated spaced relation thereto, and the tube of larger diameter being bent between said straight portion and the flattened portion to partially conform to the cross-sectional shape of the primary winding. The space between the straight portions of the tubes forms a part of the coolant flow circuit, and the flattened portions of the tubes have perforations permitting circulation of the coolant through the tubes.

A primary object of the present invention is to provide a transformer for a resistance welder which shall embody a novel and improved construction of secondary conductors and arrangement thereof with respect to each other and to the primary, which can be easily and economically manufactured and is readily adaptable to changes in sizes and shapes with a minimum of simple tools and equipment.

Another object is to provide such a welding transformer which shall include a plurality of novel and improved identical units each including a solid thin conducting bar in the form of a loop encircling a coil or a section of a primary circuit winding and having one end connected to one of a pair of electrodes and its other end connected to the other electrode.

A further object is to provide a secondary unit of the general character described which shall include a solid conducting bar encircling a section or a coil of a primary circuit winding, one end of the bar being connected to one end of a separate tubular conductor, the other end of which is connected to one of a pair of welding electrodes, and the other end of the bar being connected to another separate conductor in telescopically associated and insulated relation to the first-mentioned conductor and connected to the other welding electrode, whereby the cost of material and assembly of the bar and the conductors shall be kept to a minimum.

Other objects, advantages and results of the invention will be brought out by the following description in conjunction with the accompanying drawings in which FIGURE 1 is a side elevation of a rotary welding apparatus embodying the invention with portions broken away and shown in longitudinal vertical section;

FIGURE 3 is a greatly enlarged fragmentary sectional perspective view of one of the secondary units detached from the transformer;

FIGURE 4 is a similar view of a modification of the secondary unit and a part of the primary winding;

FIGURE 5 is a view similar to FIGURE 4 on a reduced scale showing a modification of the secondary unit illustrated in FIGURE 4;

FIGURE 6 is a fragmentary axial view through the end portions of the two tubes and the portions of the secondary bars connected thereto, approximately on the plane of the line 5—5 of FIGURE 3;

FIGURE 7 is a view similar to FIGURE 6 on a reduced scale showing a modification of the construction shown in FIGURES 3 and 6;

Figure 1:
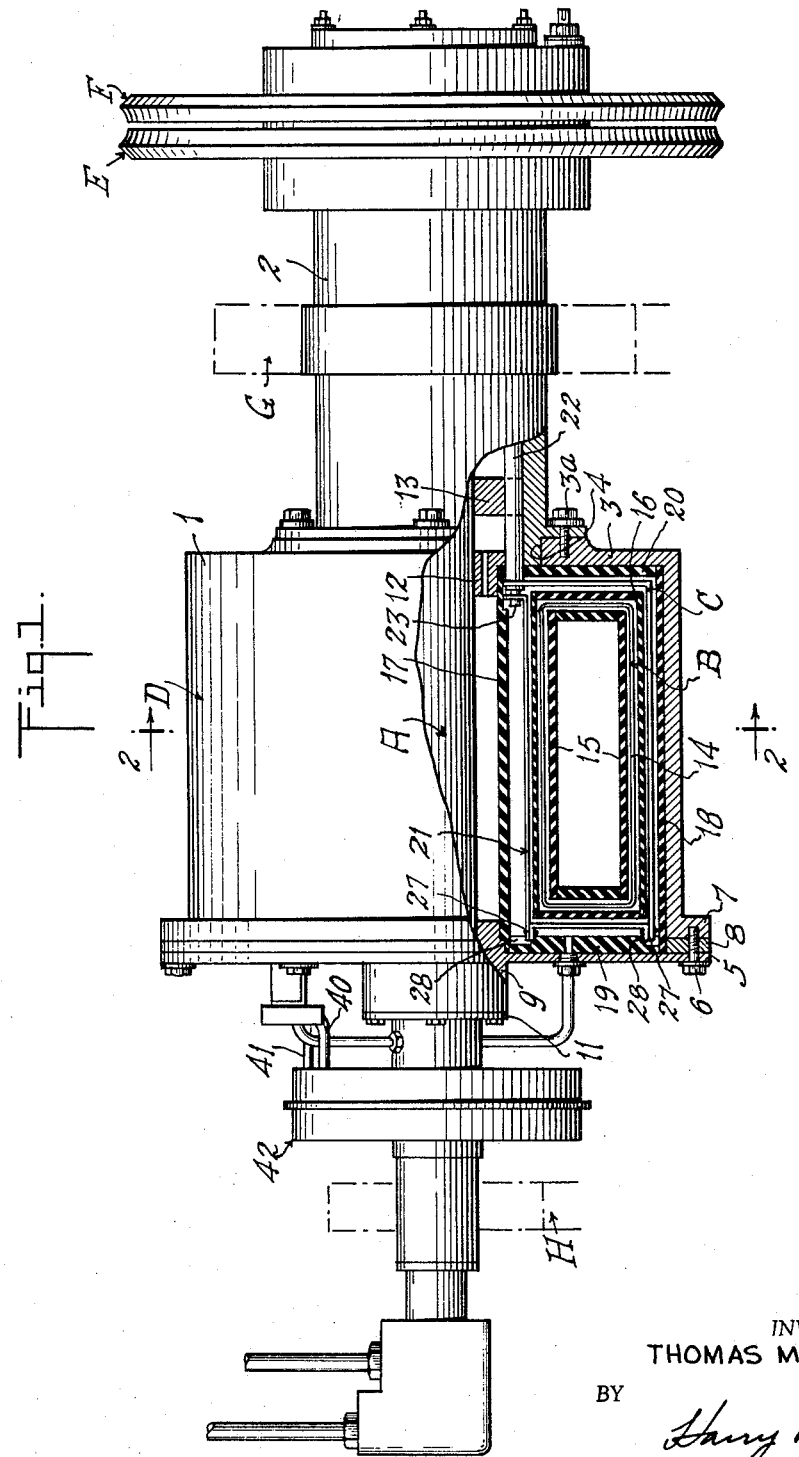

While the present invention is directed primarily to the construction of the secondary units, the new units embodying the invention have been shown in a welding transformer of the same general construction and combination of parts as shown in my aforesaid co-pending application Serial No. 34,240; and details of the assembly that are immaterial to the present invention have been omitted. Specifically describing the invention, the reference character A designates an elongated rigid supporting shaft upon which is supported the primary B, the secondary generally designated C and a casing generally designated D within which the primary and secondary are enclosed. As shown, the casing includes two sections 1 and 2 which may be formed of steel, copper or other suitable metal, the section 2 being shown as tubular and coaxial with the shaft and secured by cap screws 3a to one end wall 3 of section 1 with an end portion extending into said section 1 through an opening 4 in the end wall. The section 1 is open at its other end for insertion and removal of the secondary and primary into and from the casing and is normally closed by a cover plate 5 secured by cap screws 6 to an integral circumferential flange 7 projecting from the casing section. Preferably there is a packing ring 8 clamped between the cover and the flange to prevent escape of oil from the casing. The cover 5 has a cylindrical hub portion 9 through which extends the shaft A, there being a suitable packing ring like that shown in my co-pending application to seal the joint between the hub and the shaft and normally clamped into position by a clamping ring 11.

Electrodes E and F, shown as of the wheel type, comprise, as usual, parts of the secondary circuit and may be associated with the shaft A and the casing in any suitable manner such as shown in my aforesaid application, it being understood that the two electrodes are insulated from each other.

The whole assembly is mounted in any suitable manner to permit rotation of the electrode wheels; for example, the casing section 2 and the shaft A may be mounted in suitable supports G and H that may include radial bearings and stationary supports therefor, generally designated by broken lines in FIGURE 1. Preferably spacer rings 12 and 13 are disposed between the shaft A and the end portions of the casing opposite the hub 9 so that the casing will be firmly supported on the shaft.

As hereinbefore stated, the casing in prior apparatus has comprised a part of the secondary circuit and has been formed of castings which had to be specially cast and machined to suit special designs, whereas the casing described in my co-pending application and the casing D hereinbefore described do not comprise any part of the secondary circuit.

Figure 8:
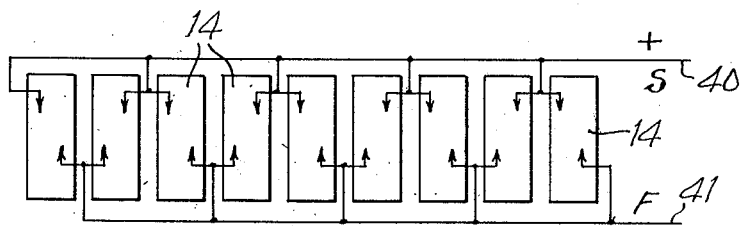
FIGURE 8 is a schematic wiring diagram showing the primary coils connected in parallel relation.
Figure 9:
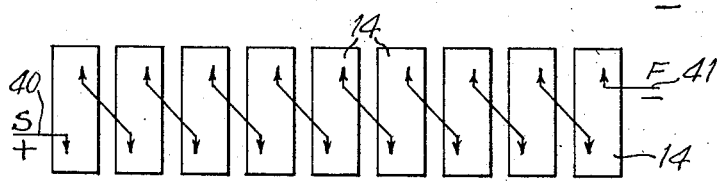
FIGURE 9 is a similar view showing the primary coils connected in series relation.
Figure 10:
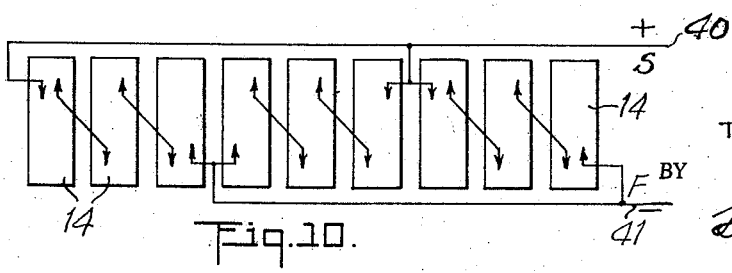
FIGURE 10 is a view like FIGURE 9 showing the primary coils connected in series-parallel relation.

The section 1 of the casing encloses the primary winding B which may be continuous as shown in my co-pending application or may be formed of a plurality of individual coil-sections 14 which may or may not be wound upon an annular iron core depending upon the purpose for which the transformer is to be used. Where the independent coil-sections 14 are utilized as shown, they are spaced apart circumferentially of the shaft A and in spaced relation to the shaft with their axes perpendicular to the axis of the shaft, and they may be connected in either parallel circuit, series circuit or series-parallel circuit as schematically shown respectively in FIGURES 8, 9 and 10. The primary winding may be connected in circuit in any suitable manner, for example, as shown in my aforesaid pending application, including conductors 40 and 41 which are connected to the primary winding terminals and extend from the cover 5 in insulated and fluid-tight relation thereto and are connected to a slip ring assembly generally designated 42 with which coact suitable brushes (not shown) for conducting electric current from a source to the slip rings and conductors 40 and 41. The primary winding coil-sections are shown as wound on an annular core of insulation 15 and are insulated from the casing by an insulating sheath 16. A tube of insulating material 17 coaxially encircles the portion of the shaft A within the main casing 1 and is mounted on an inward extension of the hub 9 and the spacer ring 12 so as to provide a space between the tube and the shaft for circulation of a coolant if desired. Also, a layer 18 of insulating material covers the inner surface of the cylindrical wall of the main casing section 1 and flat rings 19 and 20 of insulating material are secured to the inner surfaces of the cover plate 5 and the end wall 4 of the casing section, respectively.

Figure 2:
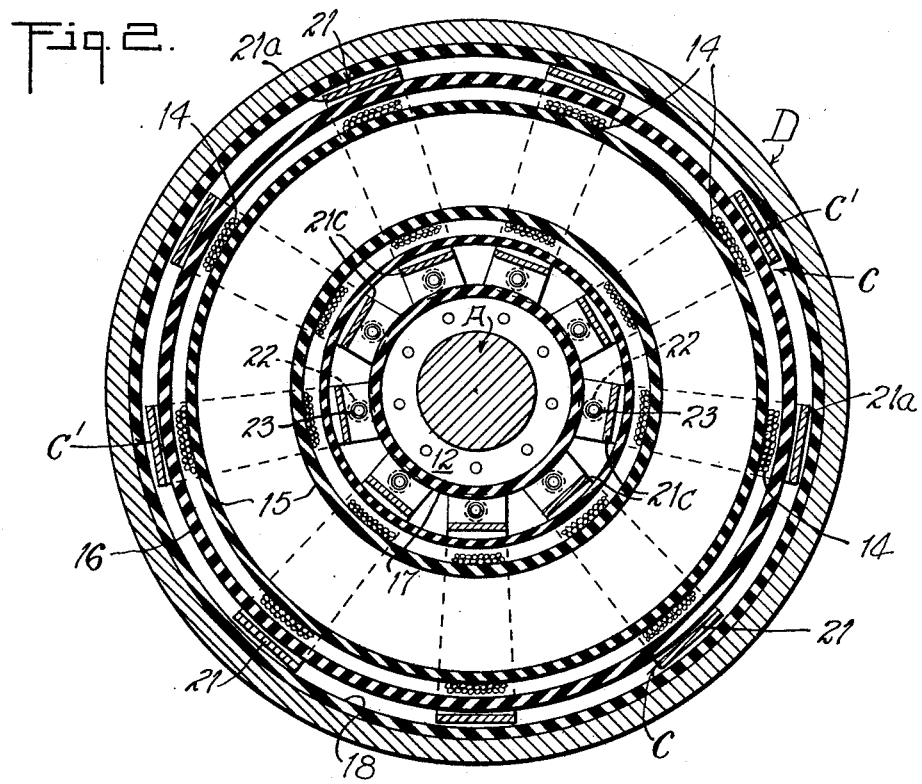
FIGURE 2 is an enlarged transverse vertical sectional view approximately on the plane of the line 2—2 of FIG. 1.

The secondary C comprises a plurality of units C' one of which is shown for each of the primary winding coil-sections 14, as best illustrated in FIGURE 2.

These units are spaced equidistantly circumferentially with respect to the primary winding and each is composed of a bar 21 of conducting material such as copper of suitable width, for example, about equal to the width of the primary coil-section 14, said bar being in the form of a loop encircling the primary winding and having its end connected to one end of a tubular conductor 22 and its other end connected to one end of a conductor 23 which is disposed in telescopic relation to the conductor 22 and insulated therefrom as by a sleeve of insulating material 24. The other end of the conductor 22 is connected to one of the welding electrodes while the corresponding end of the other conductor 23 is connected to the other electrode so that the bar 21 is connected in series circuit with the electrodes. The bar is preferably formed of copper strip material of a thickness of the order of one-eighth to three-eighths inches and having a width of the order of two inches, the length of the bar depending upon the cross-sectional dimensions of the primary winding.

Where the primary winding is rectangular in cross-section as shown in FIGURE 1, the bar 21 will also be of rectangular configuration, as best shown in FIGURE 3, and preferably the bar will be formed of three sections, one section 21a having one end connected to the conductor 22 and being bent intermediate its ends at 22b so that the section is approximately L-shaped with one leg of the L disposed along one end of the primary winding and the other leg disposed in parallel relation to the outer periphery of the primary winding. Another section 21c is also L-shaped and has one leg connected to the conductor 23 and the other leg disposed approximately parallel to the inner periphery of the primary winding. The two sections 21a and 21c are rigidly connected together by the third section 21d that is disposed parallel to the other end of the primary winding. As shown, the section 21d is riveted to the other sections by rivets 26 but of course the parts might be welded together. It will be seen that the construction is simple, comprises few parts, and that the parts can be economically made and assembled together with a minimum requirement for special tools.

For holding the secondary units C' in spaced relation to each other, I have shown the spacer ring 13 formed with a notch in its periphery through each of which extends one of the conductors 22, while the other end of each unit has projecting portions 27 seated in notches 28 in the insulating disc 19.

As shown in FIGURE 3, the conductor 23 may be tubular to serve as a conduit for the flow of a coolant liquid through the casing around the primary and secondary, as generally shown and described in my aforesaid pending application, but if desired, the inner conductor may be formed of solid rod 29 as shown in FIGURE 7, and there may be a space 31 between the inner conductor 29 and the outer conductor 30 for the flow of the coolant liquid.

It may be desirable in some instances to make the secondary unit bars of the generally circular or cylindrically tubular shape as shown in FIGURE 4, instead of rectangular as shown in FIGURE 3. In FIGURE 4 the secondary conducting bar 32 is shown as formed of two complemental sections 32a and 32b each of which has a segmentally cylindrical portion complemental to the segmental cylindrical portion of the other section and has one end rigidly connected to the other section in any suitable manner as by rivets 34. The other end of the portions 32c and 32d of the sections, respectively, are disposed approximately tangential to the segmentally cylindrical portions and one thereof is rigidly connected to one of the conductors 22b corresponding to the conductor 22 while the other end portion 32c is rigidly connected to the conductor 23b that corresponds to the conductor 23. Obviously with this type of secondary conducting bar, the primary winding generally designated B' will be circular in cross-section, of annular shape and encircled by the conducting bar 32. Also, it will be understood that the casing will be suitably modified in size and shape to house the primary and the secondary.

A modification of the secondary unit shown in FIGURE 4 is illustrated in FIGURE 5 where the conducting bar 35 is formed of three sections that have complementary arcuate sections 35a, 35b and 35c that have complemental portions each constituting a segment of a cylinder, one section 35b preferably being semi-cylindrical and having its ends rigidly connected at 36 and 37 to one end of each of the other sections 35a and 35c, and the sections 35a and 35c have the respective end portions 35d and 35e connected to the respective conductors 22c and 23c that correspond to the conductors 22 and 23.

The thin secondary conductor bars provide exceptionally high electrical conductivity and also make it possible to operate the welding apparatus with high frequencies of for example 360 cycles or higher and heavy currents of the order of 100,000 to 300,000 amperes, with a minimum of electrical and eddy current losses. This structure can be used with much higher frequencies of the order of 300 to 400 kilocycles with modifications in the core structure and the size and arrangement of the secondary conductor bars. Where the transformer is to be used for lower frequencies, an iron core may be used in the primary winding, but where the transformer is to be used for extremely high frequencies, the iron core preferably will be omitted. The formation of the secondary conductor bars of copper strips or straps which have the respective holes 38, 39 in which the conductors 22 and 23 are rigidly secured as by welding or brazing, provides a simple and relatively inexpensive construction that can be manufactured at low cost and with easy adaptability to changes in the shapes and sizes of the conductor bars to suit different conditions.

While the now preferred embodiments of the invention have been illustrated and described, it should be understood that modifications and changes in the construction of the transformer can be made within the spirit and scope of the invention.

I claim:

1. A resistance welding apparatus comprising a supporting shaft, a welding transformer including a primary winding comprising a plurality of separate coil sections spaced apart circumferentially of said shaft in spaced relation to the shaft and connected in circuit with each other with their axes perpendicular to axial planes of said shaft, and a secondary circuit that includes a pair of welding electrodes mounted on said shaft in insulated relation to each other and in spaced relation to said primary winding, said secondary circuit also comprising a plurality of separate and distinct units each having portions encircling and in inductive relation to one of said coil sections, each unit having two terminals each connected to one of said electrodes.

2. A resistance welding apparatus comprising a supporting shaft, a welding transformer including a primary winding comprising a plurality of separate coils spaced apart circumferentially of said shaft in spaced relation to the shaft and connected in circuit with each other, and a secondary circuit that includes a pair of welding electrodes mounted on said shaft in insulated relation to each other and in spaced relation to said primary winding, said secondary circuit also comprising a plurality of separate and distinct units, each formed of a conducting bar in the form of a loop encircling one of said primary winding coils in inductive relation thereto, each of said units having its ends disposed toward said electrodes with one end connected to one electrode and its other end connected to the other electrode.

3. A resistance welding apparatus as defined in claim 2 wherein said primary winding has an annular core of insulation encircling said shaft and said separate coils are wound on said core of insulation with their axes perpendicular to the axis of said core.

4. In a resistance welding apparatus having a support, a welding transformer mounted on said support comprising a primary winding and a secondary circuit that includes a pair of welding electrodes mounted on said support in insulated relation to each other, said secondary circuit also comprising a plurality of units each formed of a solid conducting bar encircling a portion of the primary winding, a first conductor and a second conductor for each unit coaxially disposed on said support each having one end connected to one of said electrodes, one end portion of said conducting bar being connected to the other end of the first conductor and the other end portion of the conducting bar being connected to the other end of the second conductor.

5. In a resistance welding apparatus as defined in claim 4, one of said conductors being tubular and having the other conductor telescopically associated therewith, one end portion of said conducting bar having an opening in which the end of the first conductor is rigidly fitted in conducting relation thereto, the other end portion of said conducting bar having an opening in which the end of the second conductor is rigidly fitted in conducting relation thereto.

6. In a resistance welding apparatus as defined in claim 5 wherein said conducting bar comprises a plurality of sections connected together in end to end relation to each other.

7. In a resistance welding apparatus as defined in claim 4 wherein said primary winding comprises a plurality of separate coils connected in circuit with each other, and the conducting bar of each of said secondary units encircles one of said primary winding coils in inductive relation thereto.

8. In a resistance welding apparatus as defined in claim 4, the first conductor being tubular and the second conductor being disposed in telescopically insulated relation to the first conductor.

9. In a resistance welding apparatus as defined in claim 4, said first conductor and said second conductor being tubular with the second conductor telescopically disposed within the first conductor in insulated relation thereto.

10. In a resistance welding apparatus as defined in claim 4, the first conductor being tubular and the second conductor being a solid rod in telescopically spaced relation to the first conductor and extending through the first conductor.

11. For use in a welding transformer, a secondary circuit unit comprising a solid conducting bar bent with its end portions in juxtaposed relation to each other, a first conductor and a second conductor coaxially disposed, one end portion of said conducting bar being connected to one end of the first conductor and the other end portion of the conducting bar being connected to the other end of the second conductor.

12. For use in a welding transformer, a secondary circuit unit as defined in claim 11, one of said conductors being tubular and having the other conductor telescopically associated therewith in insulated relation thereto, one end portion of the conducting bar having an opening in which the end of the first conductor is rigidly fitted and the other end portion of the conducting bar having an opening in which the end of the second conductor is rigidly fitted.

13. For use in a welding transformer, a secondary circuit unit as defined in claim 12, wherein said conducting bar comprises a plurality of sections of strip material connected together in end-to-end relation to each other.

14. A transformer including a supporting shaft, an annular primary winding coaxial with said shaft, a plurality of secondary circuit units each including a conducting bar encircling a portion of said primary winding and having its ends in juxtaposed spaced relation to each other, a first conductor and a second conductor for each unit coaxially disposed on said shaft in insulated relation to each other, one of said conductors being tubular and having the other conductor telescopically associated therewith, the ends of the conducting bar being rigidly connected to the first conductor and second conductor, respectively, in conducting relation thereto.

15. A transformer including a supporting shaft, an annular primary winding coaxial with said shaft, a plurality of second circuit units each including a conducting bar encircling a portion of said primary winding and having its ends in juxtaposed spaced relation to each other, a first conductor and a second conductor for each unit coaxially disposed on said shaft in insulated relation to each other, one of said conductors being tubular and having the other conductor telescopically associated therewith, one end portion of the conducting bar of each unit having an opening in which the end of the corresponding first conductor is rigidly fitted in conducting relation thereto, the other end portion of said conducting bar for each unit having an opening in which the corresponding end of the second conductor is rigidly fitted in conducting relation thereto, said units being equidistantly spaced apart circumferentially of said primary winding with said conducting bars in inductive relation to said primary winding, respectively, the other ends of said conductors constituting the terminals for connection to other electrical parts.

References Cited in the file of this patent

UNITED STATES PATENTS

| | | |
|---|---|---|
| 1,811,886 | Hunter | June 30, 1931 |
| 2,052,963 | Caputo | Sept. 1, 1936 |